United States Patent [19]
Powell

[11] 3,739,978
[45] June 19, 1973

[54] CONVERSION APPARATUS

[76] Inventor: Roger Andrew Powell, 1455 Whitwood Drive, Norristown, Pa. 19401

[22] Filed: Oct. 8, 1971

[21] Appl. No.: 187,734

[52] U.S. Cl. ......... 235/61 PK, 235/58 CW, 235/101
[51] Int. Cl. ....................... G06c 17/00, G07g 1/00
[58] Field of Search .................. 235/61 PK, 61 PE, 235/58 P, 60 P, 58 CW, 101

[56] References Cited
UNITED STATES PATENTS
3,120,800   2/1964   Ward .................................. 235/101
3,207,431   9/1965   Nirenberg ........................... 235/101
3,369,743   2/1968   Glassman ......................... 235/58 CW

*Primary Examiner*—Stephen J. Tomsky
*Attorney*—Warren W. Kurz

[57] ABSTRACT

Apparatus is disclosed for automatically converting inches to the metric system of measurement and for printing-out both the inch value and the metric equivalent on the surface upon which such apparatus is disposed. The apparatus may be adapted to any conversion process having a limited number of significant digits in the conversion factor.

6 Claims, 5 Drawing Figures

ROGER A. POWELL
INVENTOR.

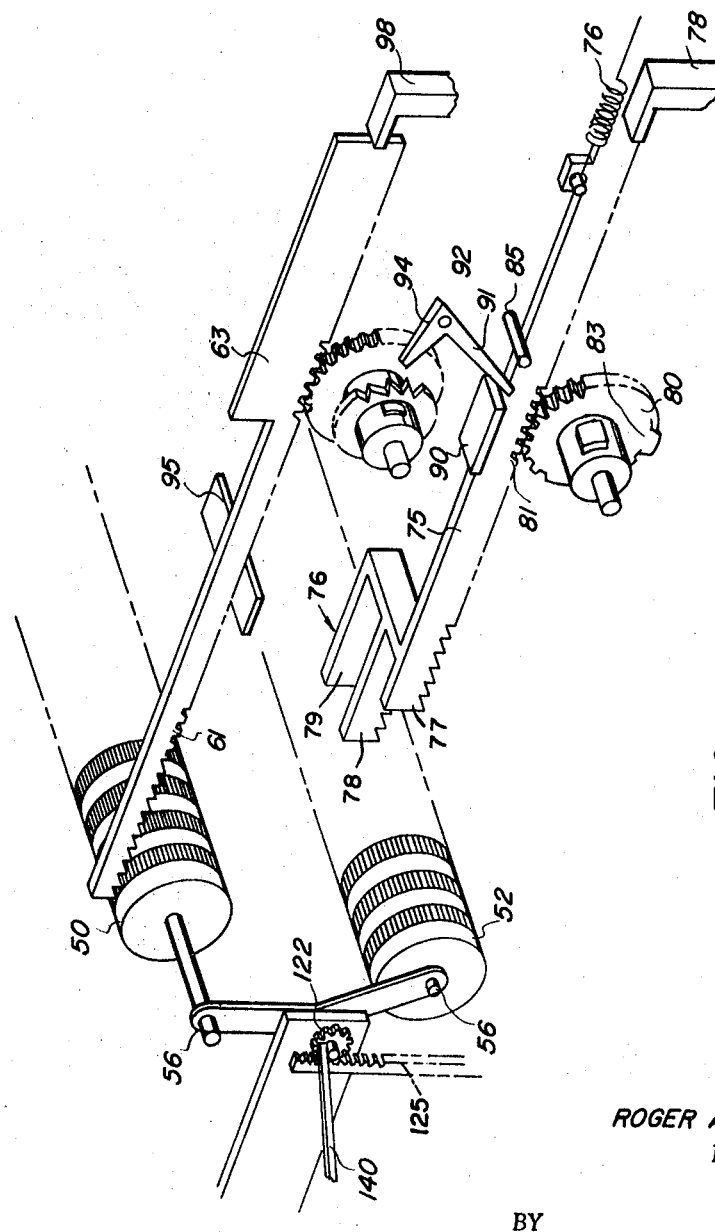

3,739,978

CONVERSION APPARATUS

BACKGROUND OF THE INVENTION

The present invention relates to conversion apparatus and more particularly to apparatus which upon receiving a variable numeric value, will automatically convert such value to a proportional value which is related to the received value by a fixed constant, and which will print-out both the received and proportional or converted value on the surface upon which the apparatus is disposed.

In light of the vast number of measurement systems throughout the world, there is always a need for a low-cost apparatus of simple construction which, upon command, will accurately convert predetermined units of one measurement system to those of another. Because of the ever-increasing trend toward the use of the metric system of measurement, a particularly useful device would be one which, when fed a value, for instance, in inches, would automatically furnish the metric equivalent. Such a device would have particular utility in laboratories, drafting rooms, technical libraries, etc.

Heretofore, conversion apparatus of the type set forth above has either been too sophisticated, and hence costly, for many applications, or not sufficiently sophisticated to provide accurate results. Exemplary of the former is the portable computing or business machine, and of the latter is the slide-rule. Moreover, except in very sophisticated automatic computing machines, conventional conversion apparatus does not provide a print-out of the variable value being converted, along with the converted value. Rather, only the converted value is printed out. Thus, should the variable number be incorrectly entered into the machine, such as by striking an incorrect key on a numeric keyboard, there is no way of determining that the converted value is incorrect. Furthermore, conventional conversion apparatus which do provide a print-out of both the variable and the converted values generally do so on a paper tape or on other material which must be subsequently transcribed prior to use. Such transcription, of course, can ultimately result in erroneous conversions, just as an incorrect entry can.

SUMMARY OF THE INVENTION

It is, therefore, an object of the present invention to provide a low-cost, yet highly accurate and reliable, conversion apparatus which suffers none of the aforementioned limitations of conventional apparatus.

Another object of the invention is to provide a conversion apparatus which, when fed an input value in inches, will print-out upon command both the input value, as well as the metric equivalent of such input.

Still another object of the invention is to provide a conversion apparatus which prints out both its input and converted value on the surface upon which the apparatus is disposed.

In achieving the above objects, a conversion apparatus constructed in accordance with the present invention includes a pair of numerical printing wheel assemblies, each comprising a plurality of rotatable printing wheels having the digits 0-9 embossed in equally spaced intervals around their circumferences, means for selectively and automatically rotating the wheels of one assembly to a printing position in which the embossed digits thereon correspond to the numerical value being converted, means for selectively and automatically rotating the wheels of the other printing assembly to a printing position in which the embossed digits thereon correspond to the converted value, and means for sequentially moving the printing assemblies into contact with the surface whereon the apparatus is disposed, thereby printing both the numerical value being converted and its equivalent on such surface. A keyboard is provided for entering the numerical value being converted into the conversion apparatus. Operatively coupled with such keyboard is a memory device for storing the entered value until such time as the print-out occurs. The memory device comprises a plurality of depressible pins, arranged in columns of ten, each column corresponding to a decade and each pin to a number from 0-9 in the decade. A movable rack, slidably engageable with the depressed pins of the memory device serves to rotate the wheels of one assembly to the desired printing position. A second rack, operatively coupled with the first and having one end terminating in a fork-like arrangement, each prong of which arrangement varies in length depending upon the numerical value of each digit for the conversion factor, serves to rotate the wheels of the second assembly to the appropiate printing position.

Other objects of the invention and its various advantages will become immediately apparent to those skilled in the art from the ensuing discription, reference being made to the accompanying drawings.

BRIEF DESCRIPTION OF THE DRAWINGS

FIG. 5 is a perspective view of the various elements used to move the printing wheels into an appropriate printing position.

DETAILED DESCRIPTION OF A PREFERRED EMBODIMENT

At the outset it should be emphasized that, while the invention is described with particular reference to apparatus for converting inches to a metric equivalent, the apparatus of the invention is readily adapted to be modified to convert an input value by a constant factor whatsoever. The conversion factor 254 referred to herein is merely exemplary.

Figure 1:
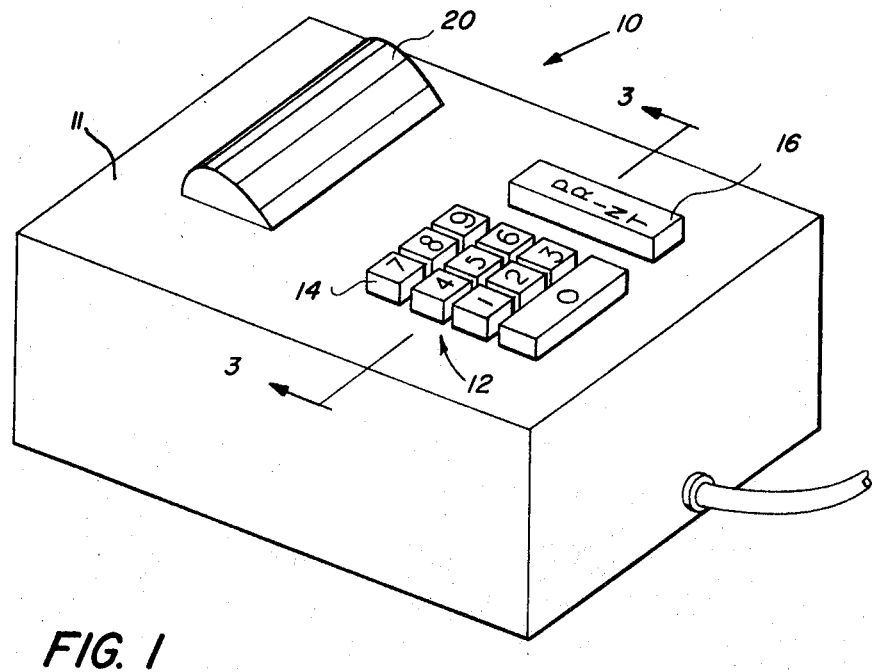
FIG. 1 is a perspective view of the conversion apparatus in accordance with a preferred embodiment of invention.

FIG. 1 illustrates a conversion apparatus, generally designated by the reference numeral 10, of the type embodied by the invention. The apparatus is electrically powered and includes a housing 11 and a keyboard 12 having a plurality of character keys 14 and a function key 16. As is conventional in business machines and the like, there are ten character keys representing the digits 0-9. Keys 14 may be individually and selectively depressed to cause the corresponding selected digits of the value being converted to be entered into the apparatus. The function key 16, when depressed initiates the conversion and printing functions of the apparatus. Since the apparatus is designed to print out the entered and converted values on the supporting surface, housing 11 is provided with an aperture 18 (shown in FIG. 4) through which print-out can occur. A magnifying glass window 20 is provided to permit the operator to accurately control the print-out position of such values upon such surface.

Figure 2:
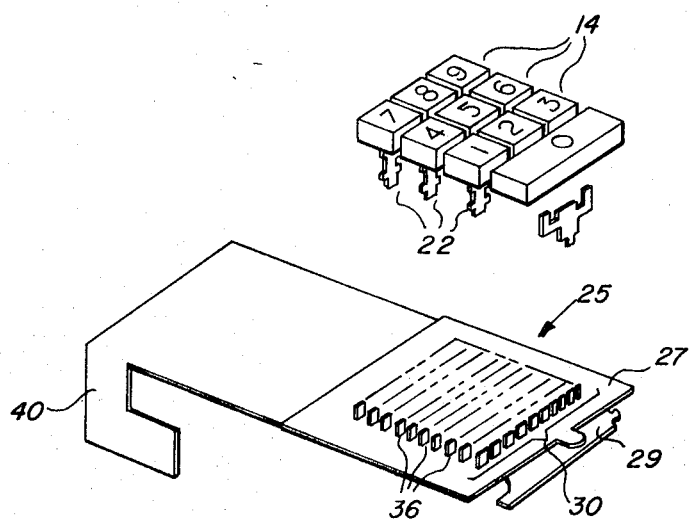
FIG. 2 is an exploded perspective view of a portion of the apparatus illustrated in FIG. 1, showing the keyboard and memory plete components.

As shown more particularly in FIG. 2, the character keys include finger pieces, each one the which has a different digit etched on the upper surface thereof corresponding to the digit represented by that individual key. Depending from each one of the character keys is a leg member 22 which is connected, by an appropriate linkage mechanism (not shown) to a memory or registry device 25, such as disclosed in U.S. Pat. No. 3,472,448. Briefly, the memory device comprises upper and lower plates, 27 and 29, respectively, which support a plurality of transversely spaced columns 30, each comprising ten longitudinally spaced memory pins 36 which are adapted to be moved from a rest position to a depressed position to register the entry of a character in the conversion apparatus. The columns 30 correspond in number to the number of digits which may be entered into the machine. For example, the left-most column corresponds to the first digit of the value being converted, reading the value from left to right, the second column from the left corresponds to the second digit of the value, etc. Thus, a value in inches described by ten digits can be converted.

The ten memory pins 36 in any one of the columns 30 respectively correspond to the digits 0–9, counting from right to left. Optionally, the tenth pin can be deleted and be replaced with a permanently depressed pin or stop; the absence of a depressed pin in column 30 would then indicate that digit 9 had been entered for that particular column.

Figure 3:
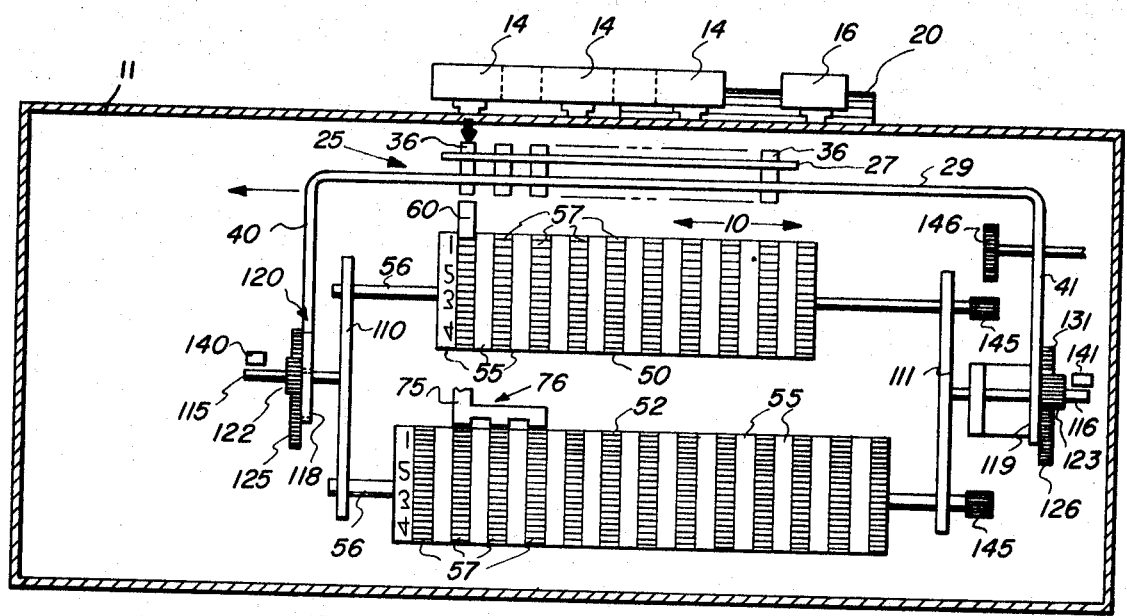
FIG. 3 is a cross sectional end view of the FIG. 1 apparatus taken in the plane 3—3, illustrating the inch and metric printing wheel assemblies.

Memory device 25 is slidably mounted, as is best illustrated in FIG. 3, being movable from a starting position in which the left-most column of memory pins 36 underlies the linkage connecting the character keys with memory device, such linkage being generally designated by the arrow in FIG. 3, to a fully extended position wherein the right-most column underlies such linkage. As each digit of the value being converted is entered into the machine, the memory device is indexed one column to the left. That is, after one memory pin is depressed in each column 30, the memory device is stepped to the left so that the adjacent column to the right thereof underlies the linkage mechanism. Indexing of the memory device after each digit of the value being converted is entered into the conversion apparatus is accomplished in a conventional manner, such as disclosed in the aforereferenced patent. When a depressed character key is released, spring means (not shown) serve to return it to its undepressed position.

Figure 4:
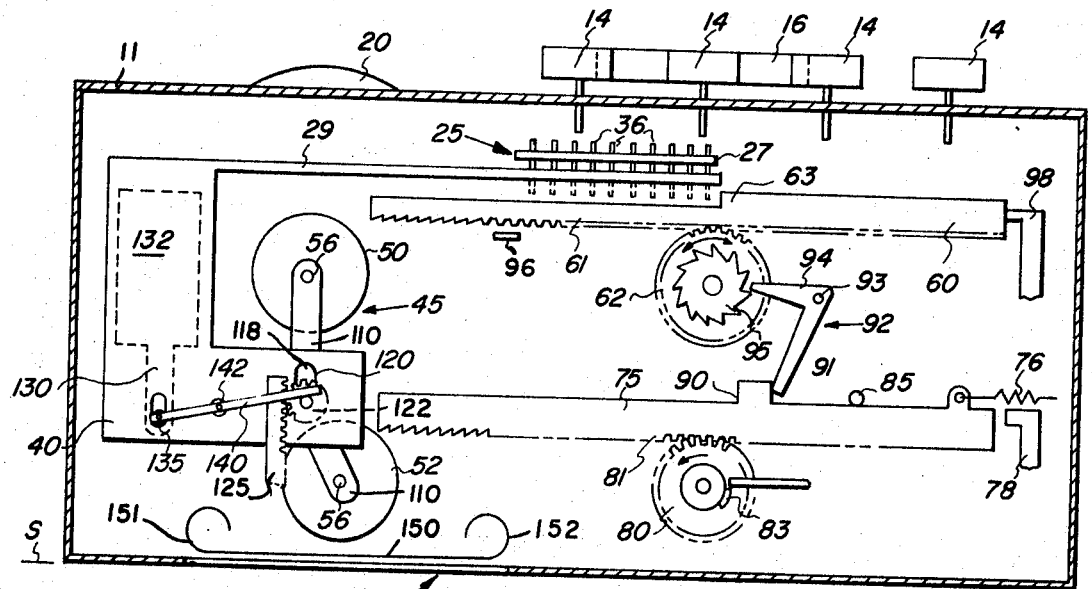
FIG. 4 is a cut-away side view of the FIG. 1 apparatus.

Referring particularly to FIGS. 3 and 4, lower plate 29 of the memory device 25 extends rearwardly from the array of memory pins 36 and has, depending from the rear edges thereof, a pair of L-shaped support arms 40 and 41, used to support the print-out mechanism, designated generally by reference numeral 45. The print-out mechanism generally comprises a pair of conventional printing wheel assemblies, 50 and 52, which are normally disposed with assembly 50 positioned above assembly 52. Each assembly comprises a plurality of spaced printing wheels 55, each representing a decade of numbers, and a shaft 56 on which the wheels are rotatably mounted. Each wheel 55 has associated therewith a driving pinion 57, which is mounted for rotation on shaft 56 in the space between adjacent pinions as shown, and is provided with ten equally spaced digits (0–9) embossed, in mirror-image fashion, around its circumference. One of such embossed digits is in a print-out position at any one time, however, before each conversion takes place, the "0" digit of each wheel is in the print-out position. The spacing between adjacent driving pinions 57 is substantially equal to the spacing between adjacent columns 30 of the memory device 25. With respect to assembly 50, each printing wheel is independently rotatable, i.e., rotation of one wheel has no effect whatsoever on the others. Unlike assembly 50, however, the wheels of assembly 52 are geared, in a conventional manner, such that as one wheel makes a complete revolution the wheel immediately to the left thereof, as viewed in FIG. 3, makes one tenth of a revolution, moving a distance equivalent to one digit. Also unlike assembly 50, assembly 52 comprises a total of thirteen printing wheels, the number being dictated by the number of digits in the conversion factor.

Disposed in a position beneath plate 29 of the memory device is the mechanism which moves rotates the wheels of assembly 50 to position the embossed digit corresponding to the entered value into the print-out position. Such mechanism comprises a driving arm 60 which serves to sequentially rotate the printing wheels of assembly 50 to a printing positioned goverened by the position of the depressed memory pins 36 in each column 30. Arm 60 is of such thickness as to pass between adjacent wheels of the printing assembly 50 and the lower edge thereof is provided with a rack 61 which is adapted to engage the teeth of print wheel-driving pinions 57. Arm 60 is slidably mounted and movable in a direction toward assembly 50 by pinion 62 which, in turn, is electrically driven in a counter-clockwise direction in a conventional manner by a one-turn clutch, through a slip-clutch (neither shown). A notch 63 formed in the upper edge of arm 60 is arranged to engage the bottom portion of a depressed memory pin so as to retard further movement of arm 60 toward the printing mechanism under the influence of the one-turn clutch. The slip clutch permits the axle of pinion 62 to make one complete revolution even though notch 63 is engaged with a depressed memory pin. The circumference of pinion 62 is sufficiently long to move arm 60 from a rest position, as shown in FIG. 4, to a position in which notch 63 engages the tenth memory pin, shown in a depressed position in phantom lines, which, when depressed, indicates that digit 9 was entered on the keyboard.

The mechanism for rotating the printing wheels of assembly 52 into a position wherein the converted value (i.e. the product of the value entered on the keyboard and the inch-to-metric conversion factor, 254) may be printed on surface S comprises a slidably mounted conversion arm 75 which is biased by spring 76 against stop 78. Conversion arm 75 is positioned directly beneath arm 60 and, like arm 60, can be driven toward the printing mechanism by a pinion 80 which engages a rack 81 formed on the lower edge thereof. As best shown in FIG. 5, the free end of arm 75 terminates in a three prong fork-like arrangement 76 comprising prongs 77, 78 and 79. The lower edge of each prong is provided with ratchet teeth which are adapted to engage and rotate pinions 57 of assembly 52 in a counter-clockwise direction, yet permit the pinions to rotate counter-clockwise themselves even while in engagement therewith. As mentioned above, whenever a wheel is rotated one complete revolution so that the digit "0" is moved into the printing position, the adjacent wheel to the left thereof must be permitted to rotate one-tenth of a revolution, or one digit. Due to the geometry of the ratchet teeth of prongs 77, 78 and 79 such rotation is permitted. The spacing between the prongs of arm 75 are such as to engage three adjacent pinions 57. The length of each prong determines the amount of rotation of each pinion, and its respective printing wheel. Thus, for a conversion factor of 254 (the inch to metric conversion factor) prong 77 is of a length sufficient to rotate a print wheel through two digits. Similarly, prongs 78 and 79 are of such a length to cause printing wheels to rotate five and four digits respectively. Like pinion 62, pinion 80 is driven electrically in a counter-clockwise direction by a one turn clutch. Disposed on the circumference of pinion 80 is a cam surface 83 which, is positioned to engage rack 81 at the end of each period of rotation and cause arm 75 to pivot clockwise about pin 85, thereby freeing the racks of prong 77, 78 and 79 and of arm 75 from pinions 57 and 80, respectively, and permitting the spring 76 to return arm 75 to its rest position against stop 78. Formed on the upper edge of arm 75 is a tab 90 which is arranged to engage arm 91 of pawl 92 as arm 75 is being returned to its rest position under the influence of spring 76. Pawl 92 is pivotally mounted on pin 93, and is arranged such its other arm 94 engages a ratchet wheel 95 which is co-axially mounted and rigidly connected with pinion 62.

In operation, the numerical value being converted (i.e. the number of inches) is entered into the apparatus by sequentially depressing the appropriate character keys 14. Upon entering the first digit, one memory pin 36 in the leftmost column 30, as viewed in FIG. 3, of memory device 25 is moved to a depressed position, such pin corresponding to the value of the entered digit. For instance, should the digit 3 be entered on the keyboard, the fourth memory pin will be depressed, remembering the first pin corresponds to the digit zero. After the first digit is entered, the memory device is automatically indexed one column of pins to the left, thereby positioning the adjacent column of pins in such a position as to be acted upon by the keyboard. Upon entering the second digit of the value being converted into the apparatus, thereby depressing an appropriate memory pin in the column second from the left, the memory device is again indexed one column to the left. This process continues until all digits representing the value being converted have been entered. Then, function key 16 is depressed to initiate the conversion and print-out cycles.

Upon depressing the "print" key 16, pinion 62 begins to rotate in a counter-clockwise direction, as viewed in FIG. 4, thereby moving from arm 60 leftward toward printing wheel assembly 50. As arm 60 moves leftward, rack 61 engages a pinion of the wheel assembly 50, causing its respective printing wheel to rotate counter-clockwise, which, in turn, causes the embossed digit "0" to move out of the printing position and the digit "1" to move into such position, assuming a digit other than zero was the last digit entered into the apparatus. Arm 60 continues to move leftward, continuing to rotate pinion 57 and increase the numerical value of the embossed digit in the printing position until notch 63 encounters the depressed memory pin representing the last digit (units decade) of the value entered. Assuming the last digit entered was "3" arm 60 would move leftward until notch 64 encounters the fourth memory pin. Further movement of arm 60 is thereby impeded. In the meantime, rack 61 will have caused the embossed digit "3" to move into the printing position. The particular printing wheel first acted upon by arm 60, counting from the left as viewed in FIG. 3, will correspond to the number of digits entered; i.e., should the value being converted be described by six digits, then the sixth printing wheel, counting from the left, will be the first wheel acted upon. Although arm 60 may be impeded before encountering the last memory pin of column 30, the axle of pinion 62 will always make one complete revolution due to its slip clutch mounting. Upon making one complete revolution, pinion 62 activates lever 96 through appropriate linkage (not shown), thereby causing lever 96 to move upward against arm 60. Such movement serves to lift arm 60 slightly upward and thereby free rack 61 from engagement with a printing wheel-driving pinion 57.

The conversion cycle is initiated when pinion 62 makes its first complPte revolution. In doing so, the axle thereof, through appropriate linkage (not shown) activates the drive axle of pinion 80, causing pinion 80 to rotate in a counter-clockwise direction. Due to the engagement of rack 81 of conversion arm 75 with pinion 80, arm 75 is moved leftward toward assembly 52, thereby causing the ratchet teeth of prongs 77, 78 and 79 to engage and rotate the printing wheels of assembly 52 via pinions 57. Prong 77 is aligned directly beneath arm 60. During the time pinion 80 completes one revolution, prongs 77, 78 and 79 have been engaged with three adjacent pinions 57 to cause the respective printing wheels to move from "0" to "2", "0" to "5", and "0" to "4", the inch-metric conversion factor. Due to the length of prong 78, it is first to engage a printing wheel pinion. Then, after prong 78 has advanced a printing wheel one digit, prong 79 engages a pinion. Finally, after prongs 78 and 79 have caused a three and two digit rotation of the printing wheels, respectively, prong 77 engages a printing wheel pinion. During the remainder of the leftward stroke of arm 75, the three printing wheels with which the three prongs are engaged rotate an additional two digits.

After completing a revolution, the cam surface 83 on pinion 80 contacts and pivots arm 75 about pin 85, thereby freeing the ratchet teeth of prongs 77–79 from their respective printing wheel pinions. Arm 75 is then returned to its starting position against stop 78 under the influence of spring 76.

As arm 75 returns to its rest position, tab 90 formed on the upper edge thereof engages an arm 91 of pawl 92, thereby pivoting the ratchet counter-clockwise. As pawl 92 pivots, arm 94 engages ratchet wheel 95, thereby rotating it, together with pinion 62, clockwise. In this manner, arm 60 is indexed rightward a distance equal to the spacing between memory pins 36 each time the conversion arm 75 makes one complete stroke.

After cam 83 loses contact with the bottom edge of arm 75 (cam 83 being adapted to remain in contact with arm 75 until spring 76 returns it to the starting position) rack 81 drops into engagement with the teeth of pinion 80, thereby starting another stroke wherein the printing wheels are rotated by the conversion fork 76. The above process continues until arm 60 is indexed back to its starting position against stop 98. A microswitch (not shown) mounted on stop 98 serves to inhibit further rotation of pinion 80 when arm 60 returns to its starting position.

When arm 60 returns to a starting position, a microswitch is activated which serves to index memory device 25 one column of memory pins rightward, toward its initial position. Upon such indexing, pinion 62 is activated again to make one complete revolution, thereby moving notch 63 of arm 60 against the depressed memory pin in the column immediately to the left of the one previously acted upon. Meanwhile, the second to last digit entered into the apparatus is moved into a printing position on assembly 50. Arm 75 is then reciprocated by the action of pinion 80 and spring 76 a number of times equal to the value of the second to last digit entered.

The above processes are continued until memory device 25, as well as arm 60, are indexed back to their respective starting positions, at which point another microswitch is tripped to commence the printing cycle. A conventional time delay circuit is activated by the second microswitch which provides sufficient time for arm 60 to make one complete stroke before the print out cycle is commenced, whereby the first digit entered into the apparatus is acted upon. At such time all wheels of assemblies 50 and 52 will be in the appropriate printing position, the wheels of assembly 50 being ready to print the entered value, and those of assembly 52, the converted value.

As indicated above, the printing cycle is commenced only after the memory device 25 is fully indexed back to its initial position, as shown in FIG. 3, and the drive arm 60 has been indexed back to its starting position abutting stop 98. At such time, two microswitches, one on stop 98, the other in such position to be engaged by printing assembly support arm 41, are activated to commence the printing cycle.

As best shown in FIGS. 3 and 4, the printing wheel assemblies 50 and 52 are disposed between parallel members 110 and 111 with shafts 56 of the wheel assemblies extending between the respective ends of members 110 and 111. Centrally located on members 110 and 111 and extending laterally outward therefrom is a pair of axles 115 and 116 which extend through vertical slots 118 and 119 formed in support arms 40 and 41, respectively. Spring means (not shown) are provided to bias axles 115 and 116 in an upward direction against the upper edges 120 and 121 of the slots. Pinions 122 and 123 are mounted on the free ends of axles 115, and 116, respectively, by way of one-way clutches (not shown) which permit pinion rotation in a clockwise direction only, as viewed in FIG. 4. Pinions 122 and 123 are disposed on their respective axle supports to engage the vertically extending racks 125 and 126 which are rigidly mounted on arms 40 and 41, respectively.

In operation, when the printing cycle is commenced, the plunger 130 of a solenoid 132 (shown in FIG. 4) is retracted, thereby lifting a laterally extending rod 135 which is coupled thereto in an upward direction. Attached to the free ends of rod 135 are the ends of a pair of print arms 140 and 141 which are pivotally mounted on pins 142. The other ends of print arms 140 and 141 are arranged to engage the free ends of axles 115 and 116. Thus, as rod 135 is lifted upward by the solenoid plunger 130, print arms 140 and 141 are pivoted clockwise about pins 142, thereby causing axles 115 and 116 to move downward in slots 118 and 119 against the spring bias. As axles 115 and 116 move downward, pinions 122 and 123 rotate clockwise thereon, due to the one-way clutch mounting, engaging racks 125 and 126, respectively as they rotate. At the end of the stroke of the solenoid plunger 130 those embossed digits of printing wheel assembly 52 which are in a printing position will strike surface S through aperture 18 in housing 11. To produce a visible print-out on surface S, a typewriter ink ribbon 150 is positioned as shown. As the solenoid plunger returns to its extended position, the upward spring bias on axles 115 and 116 will move such axles upward in slots 118 and 119. Meanwhile, the typewriter ribbon will advance one increment (i.e. the height of the embossed digits on the printing wheels) in a conventional manner from a supply reel 151 to take-up reel 152.

As axles 115 and 116 move upward towards their initial starting position, arms 111 and 110 are rotated in a counter-clockwise direction. Such rotation is caused by the engagement of pinions 122 and 123 with racks 125 and 126, respectively. Since the pinions are not permitted counter-clockwise rotation on their respective axle supports due to their one-way clutch mounting, the pinions act as though they are rigidly coupled with their respective axle supports. Thus, as axles 115 and 116 return to their starting position, they are caused to rotate. When the axles return to their starting positions they will have rotated 180°, thereby rotating arms 111 and 112, the same amount. In this manner the print wheel assembly 50 is moved into the position previously occupied by assembly 52. Reactivation of solenoid 132 again causes axles 115 and 116 to move downward, this time causing assembly 50 to strike surface S, thereby printing the value being converted thereon. As the solenoid plunger returns to its unretracted position, assemblies 50 and 52 exchange positions in the previously described manner. Resetting of the printing wheels assemblies, i.e., moving the digit "0" of each printing wheel into the printing position, can be accomplished in a conventional manner by sequentially rotating printing wheel shafts 56 subsequent to the printing operation. Such rotation can be achieved by rigidly mounting pinions 145 to a free end of each shaft and moving a resetting rack 146 into engagement with such pinions during the rotation sequence of the print wheel assemblies.

While the invention has been disclosed with reference to a preferred embodiment, it should be understood that many modifications and substitutions can be made thereto without departing from the spirit and scope of the invention as set forth in the accompanying claims.

I claim:

1. Apparatus for converting a numeric value to a proportional value which is related to the numeric value by a fixed constant and for printing both the numeric and proportional values on a surface by which the apparatus is adapted to be supported, said apparatus comprising:

a housing having an aperture therein;
a pair of printing wheel assemblies disposed in said housing, each assembly comprising a plurality of printing wheels, each of said wheels representing a decade of numbers and having the digits 0–9 printably disposed in mirror-image fashion on the circumferential periphery thereof, said printing wheels of each assembly being selectively rotatable about a common axis whereby any one digit on the circumferential periphery of a printing wheel can be moved into and out of a printing position;

means disposed in said housing for selectively rotating the wheels of one of said assemblies to position digits corresponding to the numeric value into said printing position;

means disposed in said housing for selectively rotating the wheels of the other of said assembly to position digits corresponding to the proportional value into said printing position;

means disposed in said housing for causing those digits in the printing position of one of said assemblies to contact the surface supporting said apparatus, through the aperture in said housing, to print-out the value corresponding to such digits on such surface; and means disposed in said housing for subsequently causing those digits in the printing position of the other of said assemblies to contact the surface supporting said apparatus, through the aperture in said housing, to print-out the value corresponding to such digits on such surface.

2. Conversion apparatus according to claim 1 further comprising a keyboard having at least ten character keys, each representing a unique digit from "0" through "9" and being mounted for movement from a rest position to a depressed position wherein a digit of said numeric value is entered into said apparatus.

3. Conversion apparatus according to claim 2 further comprising memory means operatively coupled to said keyboard for receiving and storing said numeric value upon being entered into said apparatus, said memory means comprising a plate member having a plurality of memory pins disposed thereon in at least one rectilinear column, each of said pins being operatively coupled to a unique character key of said keyboard and being selectively movable from a rest position to an operative position in response to movement of its respective character key to a depressed position, said memory pin, when in an operative position, serving to limit movement of said single rack along said predetermined path, whereby the extent of engagement of said rack and said pinion means is controlled by each of said character keys.

4. Conversion apparatus according to claim 1 wherein each of said printing wheels has a pinion rotatably mounted therewith and said means for selectively rotating the printing wheels of one of said printing wheel assemblies comprises a single rack which is slidably mounted in said housing for rectilinear movement along a predetermined path, and said apparatus further comprises means for moving said printing wheel assemblies parallel to the axis of rotation of the printing wheels thereof, whereby each of said pinions of said one of said assemblies can be disposed relative to said predetermined path so as to be engageable by said rack during movement thereof along said predetermined path.

5. Conversion apparatus according to claim 4 wherein said means for selectively rotating the wheels of the other of said assemblies comprises a plurality of spaced racks, the number of racks being proportional to the number of non-zero digits of said fixed constant, each of said racks being movable along a predetermined path and having a length proportional to one of the digits of said constant value, and means for reciprocating said racks along said path.

6. Conversion apparatus according to claim 5 further comprising means for moving said other of said assemblies parallel to the axis of rotation of the printing wheels thereof, whereby any of said pinions of said other of said assemblies can be engaged by each of said racks and rotated thereby, whereby each printing wheel of the other of said assemblies having a pinion engaged by one of said racks is rotated through a distance proportional to the length of the respective rack in engagement with its respective pinion during each reciprocating movement of said rack.

* * * * *